United States Patent [19]
Alon et al.

[11] Patent Number: 5,793,549
[45] Date of Patent: Aug. 11, 1998

[54] METHODS AND APPARATUS FOR SYNCHRONIZING READ OUT OF DATA FROM MULTIPLE TRACKS OF AN OPTICAL STORAGE DEVICE

[75] Inventors: Amir Alon, Sunnyvale, Calif.; Jacob Finkelstein, Kfar Saba, Israel

[73] Assignee: Zen Research N.V., Curacao, Netherlands

[21] Appl. No.: 801,397

[22] Filed: Feb. 20, 1997

Related U.S. Application Data

[63] Continuation-in-part of Ser. No. 559,429, Nov. 15, 1995, Pat. No. 5,627,805.

[51] Int. Cl.$^6$ ........................................... G11B 5/09
[52] U.S. Cl. .................................... 360/51; 369/59
[58] Field of Search .......................... 369/47, 48, 49, 369/53, 54, 59, 124; 360/25, 29, 30, 51

[56] References Cited

U.S. PATENT DOCUMENTS

| | | |
|---|---|---|
| 4,460,988 | 7/1984 | Gordon . |
| 4,486,870 | 12/1984 | Pettigrew et al. . |
| 4,536,866 | 8/1985 | Jerome et al. . |
| 4,646,280 | 2/1987 | Toyosawa . |
| 4,839,887 | 6/1989 | Fennema . |
| 4,918,676 | 4/1990 | Miyasaka . |
| 4,972,396 | 11/1990 | Rafner . |
| 4,980,876 | 12/1990 | Abate et al. . |
| 4,989,190 | 1/1991 | Kuroe et al. . |
| 5,001,732 | 3/1991 | Nomura et al. . |
| 5,081,617 | 1/1992 | Gelbart . |
| 5,111,445 | 5/1992 | Psaltis et al. . |
| 5,128,919 | 7/1992 | Narahara et al. . |
| 5,150,347 | 9/1992 | Yanagi . |
| 5,199,017 | 3/1993 | Kagami et al. . |
| 5,210,726 | 5/1993 | Jackson et al. . |
| 5,233,583 | 8/1993 | Reno . |
| 5,239,530 | 8/1993 | Seo et al. . |
| 5,245,597 | 9/1993 | Lee et al. . |
| 5,274,507 | 12/1993 | Lee . |
| 5,283,776 | 2/1994 | Takagi . |
| 5,295,125 | 3/1994 | Oonishi et al. . |
| 5,301,174 | 4/1994 | Matoba et al. . |
| 5,313,448 | 5/1994 | Sukeda et al. . |
| 5,361,245 | 11/1994 | Yoshida et al. . |
| 5,394,386 | 2/1995 | Park et al. . |
| 5,426,623 | 6/1995 | Alon et al. . |
| 5,465,244 | 11/1995 | Kobayashi et al. . |
| 5,566,159 | 10/1996 | Shapira . |

*Primary Examiner*—Paul W. Huber
*Attorney, Agent, or Firm*—Fish & Neave; Nicola A. Pisano; Michael J. DeHaemer

[57] ABSTRACT

Methods and apparatus are provided for simultaneously reading data from multiple tracks of an optical disk at a high rate. Circuitry is provided for generating a reference data clock independently of spindle motor speed and the spindle motor speed servo circuitry. Circuitry is also provided for deriving individual track data clocks from the reference data clock, while correcting for phase and frequency errors resulting from variations in the linear velocity of the tracks being read, depending upon the radial position of the tracks.

15 Claims, 7 Drawing Sheets

METHODS AND APPARATUS FOR SYNCHRONIZING READ OUT OF DATA FROM MULTIPLE TRACKS OF AN OPTICAL STORAGE DEVICE

RELATED APPLICATION

This application is a continuation-in-part of commonly assigned application Ser. No. 08/559,429, filed Nov. 15, 1995, now U.S. Pat. No. 5,627,805, issued May 6, 1997.

FIELD OF THE INVENTION

This invention relates to methods and apparatus for retrieving information from an optical disk at high data rates by simultaneously reading multiple adjacent tracks, and more particularly, for synchronizing simultaneous reading of data from a plurality of adjacent tracks.

BACKGROUND OF THE INVENTION

Due to their high storage density, long data retention life, and relatively low cost, optical disks are becoming increasingly popular as a means to distribute information. Large format disks have been developed for storing full length motion pictures. The compact disk (CD), and more recent mini disk (MD) formats were developed and marketed for the distribution of musical recordings and have essentially replaced vinyl records. High-capacity, read-only data storage media, such as CD-ROM, have become prevalent in the personal computer field, while the new Digital Video Disk (DVD) format may soon replace videotape as the distribution medium of video information.

An optical disk is made of a transparent disk or substrate in which data, in the form of a serial bit-stream, is encoded as a series of pits in a reflective surface within the disk. The pits are arranged along a spiral or circular track. Data is read from the optical disk by focusing a low power laser beam onto a track on the disk and detecting the light reflected from the surface of the disk, which is modulated by the pattern of the pits on the disk. Optical and imaging systems detect the modulated, reflected, laser light and produce an electrical signal which may be decoded to recover the digital data stored on the optical disk. The recovered digital data, which may include error correcting codes and additional subcoded information, is further processed to recover the stored data, which may then be converted to audio signals or executable programs.

To be able to retrieve data from anywhere on a optical disk, the optical systems include a pickup assembly which may be positioned to read data from any disk track. Servo mechanisms are provided for focusing the optical system and for keeping the pickup assembly positioned over the track, despite disk warpage or eccentricity. Some optical disks systems rotate the disk to provide a constant linear velocity of the data track relative to the pickup assembly. Accordingly, the spindle motor rotates the disk at lower rotational speeds when reading the outer edge of the disk, and higher rotational speeds when reading data tracks near the center of the disk. Newer optical disk systems may use constant rotational speeds.

Because in most previously known optical disk systems the data is retrieved from the disk serially, i.e. one bit at a time, the maximum data transfer rate for an optical disk reader is determined by the rate at which the pits pass by the pickup assembly. The linear density of the bits and the track pitch is fixed by the specification of the particular optical disk format. For example, CD disks employ a track pitch of 1.6 μm, while DVD employs a track pitch only about one-half as wide.

Previously known methods of increasing the data transfer rate of optical disk readers have focused on increasing the rate at which the pits pass by the pickup assembly by increasing the rotational speed of the disk itself. Currently, drives with rotational speeds of up to 12× standard speed are commercially available, and faster designs are on the horizon. However higher disk rotational speeds place increasing demands on the optical and mechanical subsystems within the optical disk player making such players more difficult and expensive to design and manufacture.

U.S. Pat. No. 5,426,623 describes a system to increase disk reading speeds by reading multiple tracks simultaneously. The data is read using a matrix detector that provides a track signal for each of the tracks being read. Two problems are encountered when attempting to read multiple adjacent tracks simultaneously. First, a single constant linear velocity cannot be maintained across all of the tracks being read, since for any given rotational speed, the inner tracks will have a lower linear velocity than the outer tracks; and second, a single data clock cannot be used to sample the data signals from all the tracks, since the phase of data signals from different tracks may not be in phase. Therefore, to read a large number of adjacent tracks synchronously, mechanisms must be provided to compensate for the difference in the linear velocities of the adjacent tracks and for the phase differences in the data signals.

Commonly assigned U.S. patent application Ser. No. 08/559,429, now U.S. Pat. No. 5,627,805 (ZRI-004), describes circuitry for synchronously reading multiple data tracks despite the difference in linear velocities of the multiple adjacent tracks. The present invention improves upon, and provides refinements to, that circuitry.

It would therefore be desirable to provide an optical disk reading apparatus and methods that provide high speed retrieval of information from an optical disk that permits multiple adjacent tracks of an optical disk to be synchronously read out.

SUMMARY OF THE INVENTION

In view of the foregoing, it is an object of the present invention to provide optical disk reading methods and apparatus that provide high speed simultaneous, synchronous, retrieval of multiple tracks of data from an optical disk.

These and other objectives of the invention are accomplished by providing methods and apparatus for processing, tracking, and reading data from multiple adjacent tracks simultaneously. Apparatus constructed in accordance with the present invention employs means for simultaneously reading multiple adjacent tracks of an optical disk to generate electrical data signals representative of the information-bearing pits on multiple adjacent data tracks on an optical disk. In accordance with the present invention, multi-track phase lock loop circuitry is provided for synchronizing the readout of the data from the multiple adjacent tracks to account for radial variations in linear velocity. The circuitry recovers a reference clock signal from a selected track, and then uses that signal to generate a track clock signal for each of the adjacent tracks.

Further features of the invention, its nature and various advantages will be more apparent from the accompanying drawings and the following detailed description of the preferred embodiments.

DETAILED DESCRIPTION OF THE INVENTION

Figure 1:
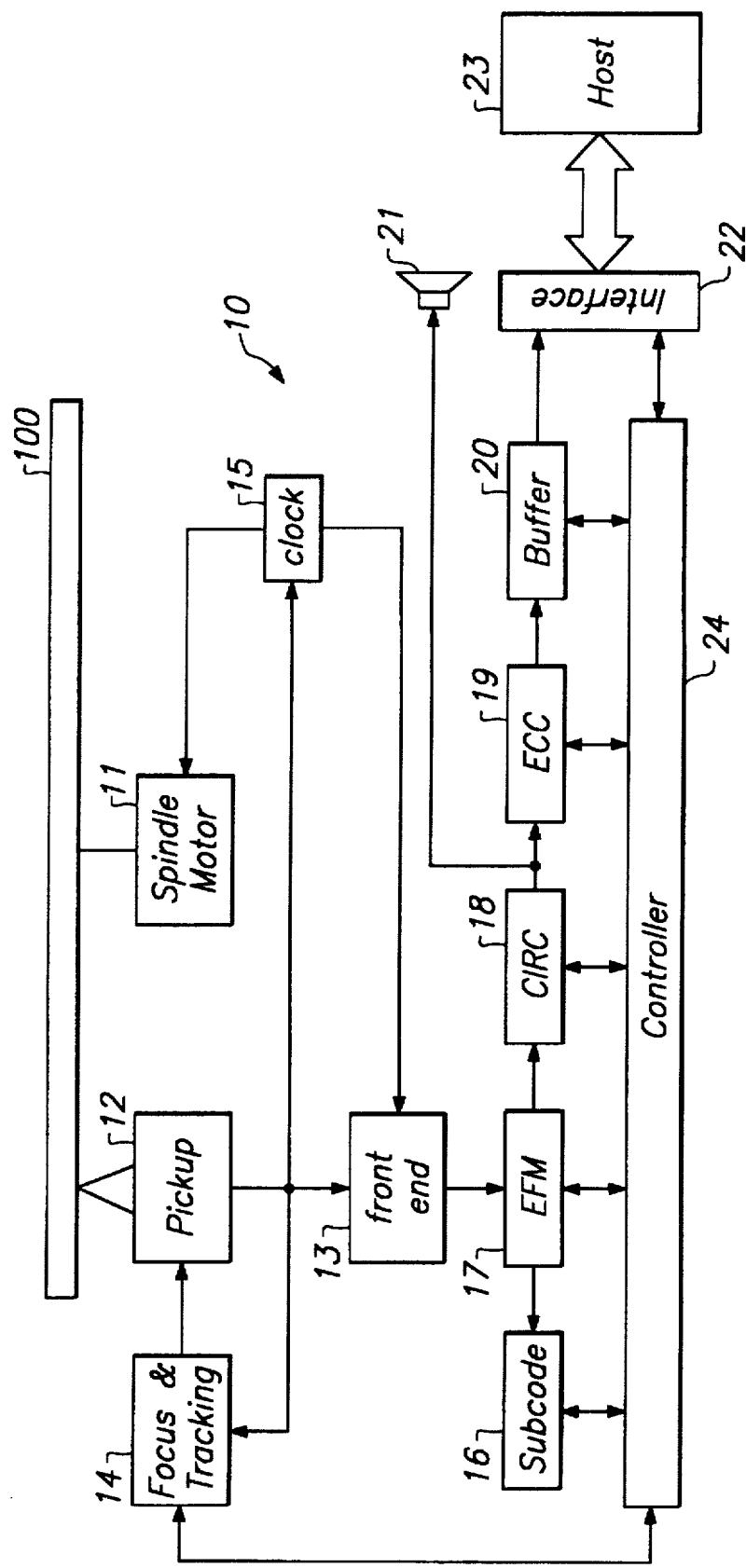
FIG. 1 is an illustrative block diagram of a previously known optical disk reader.

By way of overview, a brief description of the components and operation of a previously known optical disk reader 10 is described with respect to FIG. 1. The detailed description of the design and operation of such previously known optical disk readers may be found, for example, in *Compact Disk Technology*, H. Nakajima and H. Ogawa, published by Ohmsha, Ltd., Japan (1992), translated by Aschmann, C., IOS Press, Inc., Burke, Va., and *The Compact Disk Handbook*, Ken C. Pohlmann (2nd Ed. 1992), A-R Editions, Inc., Madison, Wis., both of which are incorporated herein in their entirety by this reference. The present invention is described hereinbelow where it differs in major respects from the previously known system of FIG. 1.

It will of course be understood that the prior art system of FIG. 1 is merely illustrative of the various types of optical disk apparatus in which the methods and apparatus of the present invention may be employed. Thus, for example, applicants expect that the invention described herein may be advantageously employed in any optical disk system, including DVD systems.

Overview of a Prior Art Optical Disk System

Illustrative previously known optical disk reader 10 comprises a spindle motor 11 that rotates optical disk 100 at high speed and pickup 12 including an illumination source and a photodetector for generating electrical signals representative of information-bearing pits formed in a reflective surface within optical disk 100. The electrical signals from the photodetector of pickup 12 are then passed to front end circuitry 13 for extracting a digital data signal. Under the control of controller 24, the data signal is further processed by eight-to-fourteen (EFM) demodulation circuitry 17, Cross Interleaved Reed-Solomon Code (CIRC) circuitry 18, error correction code (ECC) circuitry 19, and subcode circuitry 16. Controller 24 also controls focus and tracking circuitry 14, as well as buffer 20 and interface 22.

For a digital audio system, the data signals may be processed into suitable analog signals (using circuitry not shown) connected to audio means 21. Similarly, if the optical disk contains video images, the data signals may be processed for direct display on a TV or monitor. In computer applications the data signals are typically transferred from buffer 20 to host processor 23 via interface 22.

Spindle motor 11 spins optical disk 100 at a speed that depends upon the radial location of pickup assembly 12 (for example, for a 1× CD-ROM spindle speed, approximately 200–500 RPM), to maintain a constant linear velocity of an optical disk track relative to pickup assembly 12. For a CD-ROM format, this linear velocity is generally 1.4 m/s, while for the DVD format it approaches 4 m/s. Pickup assembly 12 typically includes a laser diode that illuminates only a single data track on optical disk 100 and an optical sensor onto which an image reflected from the optical disk is projected. The intensity, or other property, of the light beam reflected from the surface of optical disk 100 is modulated by inhomogeneities in the reflective surface of the optical disk (i.e., bumps or pits, referred to hereinafter as "data spots") arranged in spiral or circular tracks on optical disk 100.

Pickup assembly 12 includes circuitry to generate an electronic signal representative of the modulation in the illumination impinging upon its optical sensor due to the presence of the data spots. To ensure that the laser illumination remains focused on the reflective surface of optical disk 100, pickup assembly 12 also provides signals to focus and tracking subsystem 14.

The data spots are recorded on optical disk 100 using a modulation code that permits a data clock to be recovered from the data as it is read off of the optical disk. Clock circuitry 15 includes phase-locked-loop (PLL) circuitry for recovering the data clock from, and maintaining the data clock in synchrony with, the modulated electronic signal from pickup assembly 12. In addition to being used for extracting the data from the modulated signal, the data clock is representative of the linear velocity of the data track relative to pickup assembly 12 and may be used as a feedback signal to control the speed of spindle motor 11 to maintain a constant linear velocity.

Front end circuitry 13 uses the data clock from PLL 15 to recover a serial stream of bits from the electronic signal. Front end circuitry 13 contains additional circuitry to identify synchronization codes in the bit stream so that the serial bit stream may be correctly assembled into multi-bit data words which are transferred to demodulation circuitry 17. Demodulation circuitry 17 may be programmed for eight-to-fourteen demodulation, eight-to-fifteen demodulation (as in the SD systems), eight-to sixteen demodulation (EFM Plus), or may use another suitable demodulation scheme. The demodulated data words, or symbols, are then assembled into blocks and decoded by CIRC decoder 18 using a form of Cross Interleaved Read-Solomon code, for example, CIRC for CD-formats and CIRC Plus for DVD. Demodulated data words are also provided to subcode processor 16 which extracts data, such as block numbers, or song titles, that may be recorded in the subcode channels embedded in each block of data words.

For video and audio optical disk players, the data from CIRC decoder 18 represents, in digital form, the video or audio signal that was originally recorded and stored on the disk. These signals may then be converted to analog signals and the original recorded signal reproduced using conventional audio or video devices 21. Errors in the recovered audio or video signals are handled by interpolation and filtering circuitry (not shown) to calculate a value to use in place of the erroneous data. Because of the interpolation process, isolated errors in an audio or video signal are unlikely to be noticed when listening to the audio or viewing the video signals.

However, since a single bit error in data representing a computer program may render the program inoperable or the data unusable, optical disks used for the storage and distribution of data and programs must have very low data error rates. To reduce the data error rates to acceptably low levels, error correction codes (ECC) are added to the data when it is recorded to the disk. ECC circuitry 19 uses error correcting codes to detect and possibly correct errors in the data. Finally, the data is buffered in memory buffer 20 for transfer to host processor 23 via interface circuitry 22. Controller 24 coordinates operation of each of the optical disk reader subsystems and to control the operation of the optical disk reader as a whole.

In the previously known optical disk reader of FIG. 1, the rate of data transfer between the optical disk itself and the host processor is limited by the rate at which the data can be processed by the circuitries shown in FIG. 1. For example, for a 1× CD-ROM reader, the frequency of the signal being read from the optical disk is about 4.32 MHZ, well within the processing capabilities of the electronic circuits involved. Even in optical disk readers having a spindle speed 8× the standard speed, the data transfer rate is limited by the speed at which the data can be read off the disk.

Overview of the Present Invention

Figure 2:
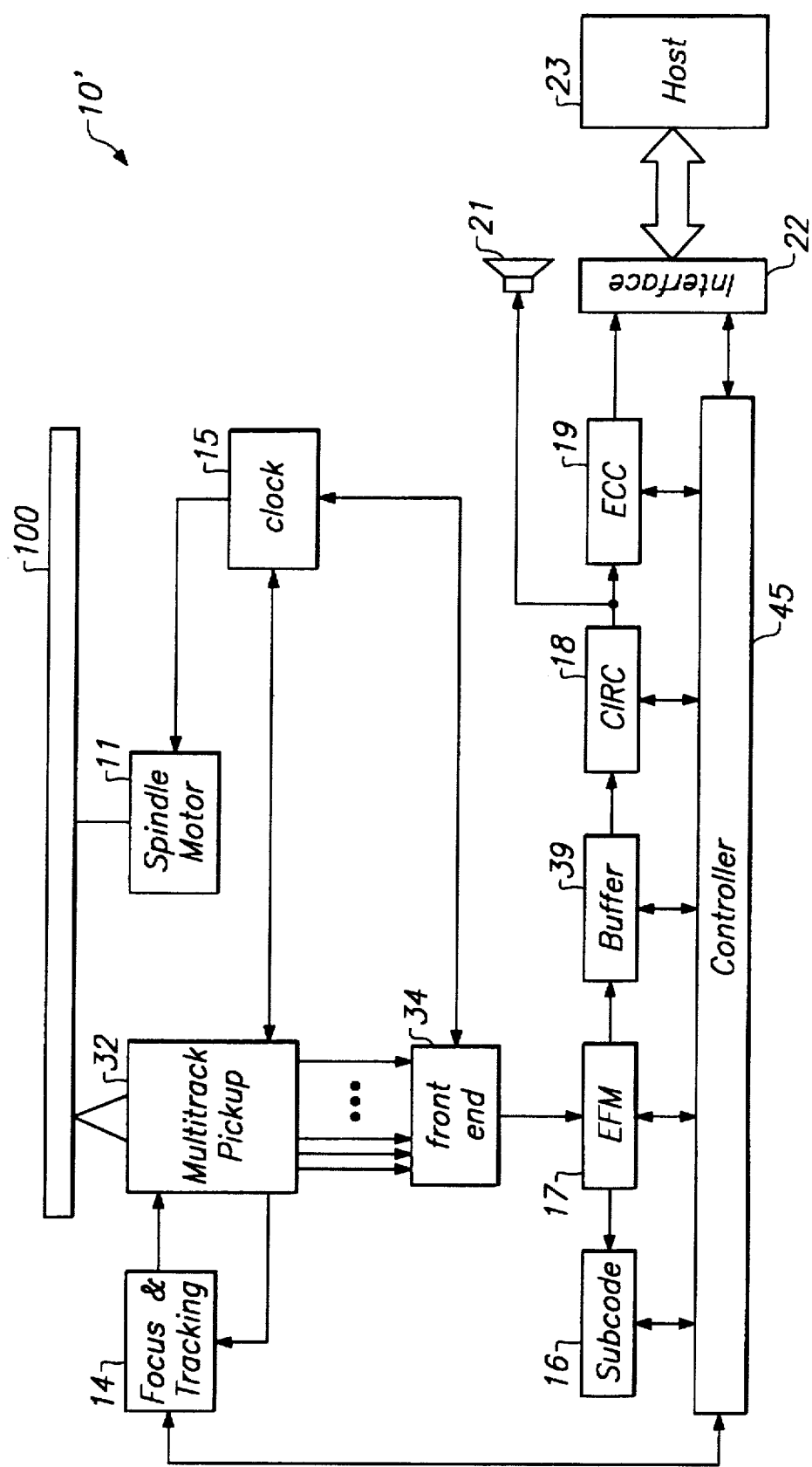
FIG. 2 is an illustrative block diagram of an optical disk reader constructed in accordance with the principles of the present invention.

Referring now to FIG. 2, optical disk reader 30 is described that provides a high data transfer rate, in accordance with the principles of the present invention, by reading multiple tracks of data from an optical disk simultaneously. Much of the circuitry of FIG. 2 may be common to or readily adapted from the circuitry of the system of FIG. 1. Accordingly, the following description describes in detail the differences between a previously known optical disk reader and apparatus 30 constructed in accordance with the principles of the present invention.

In particular, apparatus 30 may include the following features: (i) a Virtual Tracking System (VTS); (ii) circuitry for reducing cross-talk in the data signals generated for neighboring tracks of an optical disk; (iii) phase-lock loop circuitry that permits a clock associated with a reference track to be used for synchronizing the recovery of data from neighboring tracks; and (iv) a parallel write/asynchronous read architecture that enables blocks of data to be read from the optical disk, processed and written to a buffer in parallel while being asynchronously retrieved from the buffer by a host computer. Of the aforementioned features of the present invention, only item (iii) is discussed in greater detail hereinbelow, items (i), (ii), and (iv) having been disclosed in application Ser. No. 08/559,429, now U.S. Pat. No. 5,627,805, which is incorporated herein by reference. Furthermore, item (iii), as disclosed herein, may be used independently of items (i), (ii), and (iv), which are not required for practicing the present invention.

Apparatus 30 of FIG. 2 includes multi track pickup assembly 32 having a source of wide-area illumination, as described, for example, in commonly assigned U.S. Pat. Nos. 5,426,623 and 5,566,159, which are incorporated herein by reference, and in copending, commonly assigned U.S. patent application Ser. No. 08/675,526, which disclose exemplary methods and apparatus for illuminating multiple adjacent data tracks of an optical disk. Pickup assembly 32 may further include an array of optical sensors, such as a time delay integration/charge coupled device (TDI/CCD) described in U.S. Pat. No. 5,426,623, that receives light reflected from multiple adjacent data tracks of optical disk 100 and generates parallel electrical signals representative of the data spots in the multiple adjacent data tracks. Alternatively, the optical sensors may be an array of individual photodetectors of the type well known in the art.

Multi-track pickup assembly 32 outputs electrical signals, corresponding to the multiple data tracks being read, for further processing by subsequent circuitry of apparatus 30. Front end circuitry 34 performs a function similar to that of front end circuitry 13 of FIG. 1, except that multiple bit streams are processed concurrently, so additional circuitry, such as serial-to-parallel converters and first-in, first-out buffers, are provided for buffering and synchronizing data transfers to subsequent processing circuitry. Front end circuitry 34 also includes multiplexer 54 (See FIG. 3) for routing multiple data streams to EFM demodulation circuitry 38.

Buffer memory 39 is provided to buffer data read from the multiple data tracks, and to decouple the process of reading data from optical disk 100 from the process of transferring the data to host processor 44. Buffer memory 39 therefor is large enough to hold about as many data blocks from multiple data tracks of optical disk 100 as can be read in one revolution of optical disk 100. Controller 45 maps data from the multiple data tracks to buffer memory 39 so that individual data blocks will be correctly assembled without overwriting one another. As will be appreciated by those of skill in the art of buffer design, this mapping may be either dynamic or static.

Multi-track Phase Lock Loop Circuitry

Figure 3:
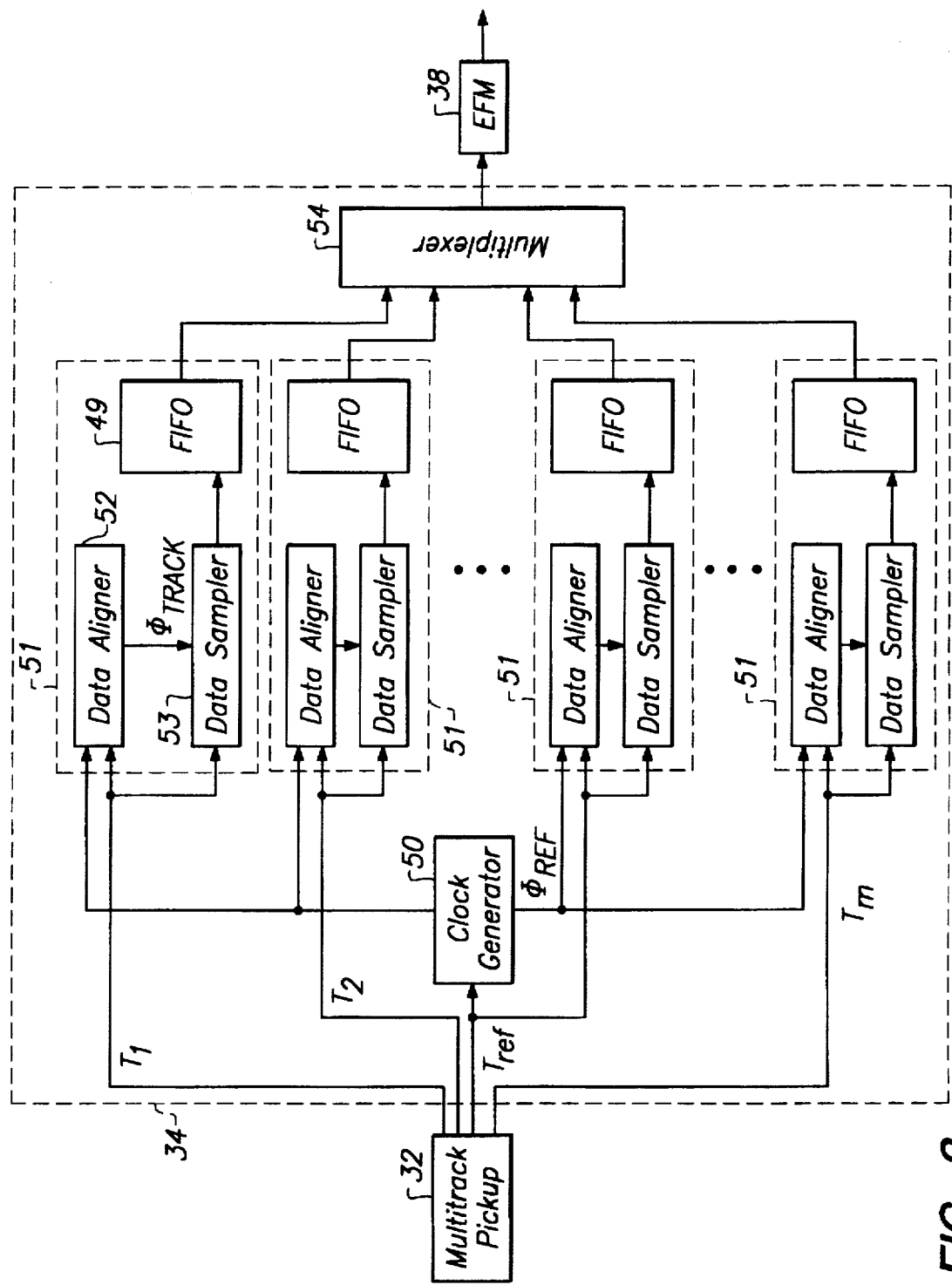
FIG. 3 is an illustrative block diagram of the front end circuitry of FIG. 2.

Referring now to FIG. 3, multi-track pickup assembly 32 of FIG. 2 outputs track data signals, $T_1 \ldots T_m$, corresponding to the tracks being read. For example, multitrack pickup assembly 32 may comprise a dedicated CCD-tracking detector, as described in copending, commonly assigned U.S. patent application Ser. No. 08/559,778, filed Nov. 15, 1995, used in conjunction with a suitable pixel selector to output the track data signals. The track data signals, $T_1 \ldots T_m$, are then processed by front end circuitry 34, including clock generating circuitry 50 and track processing circuitry 51, to extract data from each track signal. Multiplexer 54 selects extracted data words from each of track processing circuitries 51 for decoding by eight-to-fourteen decoder 38.

An accurate data clock is needed to reliably extract the data from the track data signals. By design, a track data signal is self-clocking, that is, the data stored in a data track is formatted so that a data clock can be recovered from the track signal. Typically, a Phase-Locked Loop (PLL) is used to recover the clock signal from the track data signal. In optical disk reader 30 of the present invention, clock generation circuitry 50 recovers a reference clock signal from a selected one of the multiple data tracks being read. The reference track may be, for example, the middle, innermost or outermost track of the multiple tracks being read.

The reference clock, $\Phi_{REF}$, generated by clock generation circuitry 50 has a frequency and phase which are correct for the reference track data signal. However, because the track data signals are read from tracks having different radii, and therefore slightly different linear velocities, the corresponding track data signals differ slightly in frequency and may differ substantially in phase. For example, for a CD-ROM optical disk, applicants have determined that the difference in linear track velocity, and therefore the difference in track data signal frequency, between any two adjacent tracks is approximately 0.01% anywhere on the optical disk. Furthermore, since the track data signal frequencies differ, the phase difference between any pair of track data signals varies continuously. Consequently, a single track data clock cannot be used directly to extract data from all the track data signals. Front end circuitries 51 therefore include data aligner circuitry 52, for synchronizing reference data clock $\Phi_{REF}$ to the individual track data signals, and data sampler circuitry 53, for sampling the track data signal.

Front end circuitry 51 also includes first-in/first-out buffer (FIFO) 49 for assembling the serial data into parallel data words and for synchronizing transfer of the assembled data words from front end circuitry 51 to EFM circuitry 38 via multiplexer 54. Advantageously, assembling the data words in front end circuitry 41 reduces the frequency at which subsequent circuitry operates. For example, in a standard speed CD-ROM drive, each track has a data rate of approximately four million bits per second (Mbps). Thus, multiplexer 54 would have to operate at a frequency of approximately 40 MHz (4 Mbps×10 tracks). However, by converting the data into words reduces operating frequency to about 2.9 MHz (40 Mbps/14 bits per word), greatly simplifying circuit design.

Figure 4:
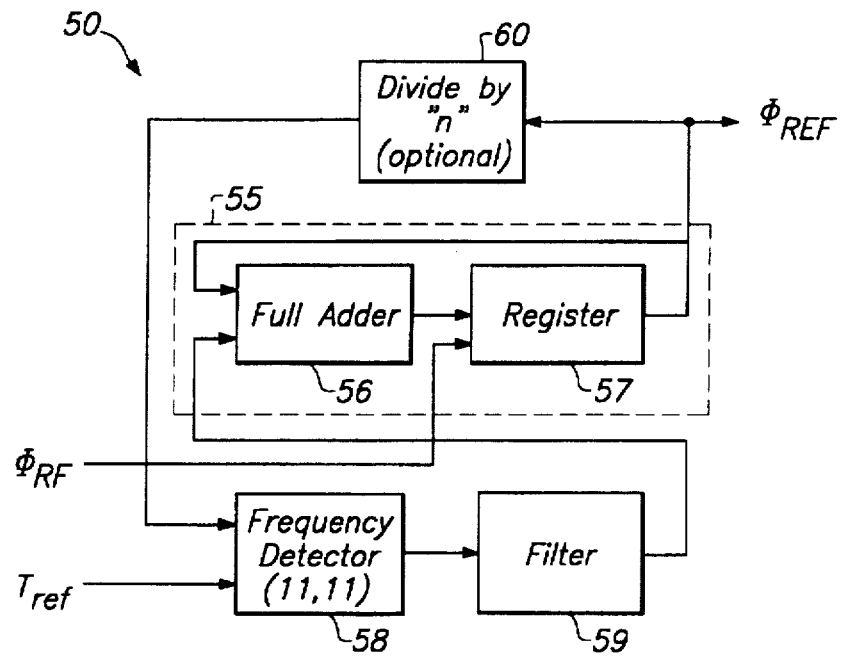
FIG. 4 is a more detailed block diagram of clock generation circuitry of FIG. 3.

Referring now to FIG. 4, clock generation circuitry 50, is described in greater detail. The core of clock generation circuitry 50 is formed by accumulator 55, comprising full adder 56 and register 57. The output of register 57 is fed back to one of the inputs of full adder 56; the other input being a frequency increment value supplied by filter 59. Register 57 latches the output of full adder 56 on every cycle of on its clock input. Since the output of full adder 56 is the sum of the contents of register 57 and the frequency increment, the data value stored in register 57 is incremented by the frequency increment every clock cycle.

The clock input to register 57 is provided by a radio frequency (RF) clock signal $\Phi_{RF}$. Although many frequencies may be used, frequencies greater than about 200 MHZ are preferable, as higher frequencies provide greater precision and finer control over the frequency of reference clock $\Phi_{REF}$. Thus, the data value in register 57 is incremented at a rate determined by the frequency increment provided by filter 59 and the frequency of $\Phi_{RF}$.

Eventually, the sum of the frequency increment and the value stored in register 57 will no longer fit in register 57, and the register will overflow. A new clock signal, $\Phi_{REF}$ may then be generated whenever register 57 overflows, which will occur at a frequency given by:

$$F_{REF} = F_{RF}\left(\frac{\text{Frequency Increment}}{\text{Register Capacity}}\right) = F_{RF}\left(\frac{\text{Frequency Increment}}{2^{Register\ size}}\right) \quad (1)$$

Alternatively, the most significant bit (MSB) of register 57 may provide the new clock signal. While the frequency of $\Phi_{RF}$ and the size of register 57 are fixed, the value of the frequency increment is preferably generated so that the frequency of $\Phi_{RF}$ is a multiple of the bit rate of reference track $T_{REF}$, e.g., eight times the bit rate. Divide by "n" block 60 may be provided to alter the resolution of the counters by altering the rate the counters are clocked.

Although the nominal bit rate of a CD-ROM is known, the CD-ROM specification permits a variation of ±10% in linear track velocity. Thus, the bit rate of the reference track may also vary. In accordance with the principles of the present invention, frequency detector 58 varies the frequency increment as needed to adjust $\Phi_{REF}$ to match the $T_{REF}$ bit rate.

Data on a CD-ROM is encoded using an eight-to-fourteen code, in which no fewer than three and no more than eleven consecutive bits have the same value. Since data is recorded so that the beginning and end of a data spot indicate transitions in the bit pattern (i.e., 0 to 1 or 1 to 0), a track data signal appears as a square wave in which the positive and negative half cycles are at least three, and at most eleven, bit periods long. Thus, in accordance with principles of the present invention, a proper data clock frequency can be determined by measuring the pulse width of the longest and/or shortest positive and negative half cycles in a track data signal. By extension the shortest possible pulse width, or the duration of a sequence of pulses, may also be used to determine a clock frequency.

Advantageously, data on a CD-ROM is organized into sectors and frames, wherein each flame is 588 bit periods in length and begins with a unique synchronization pattern comprising a sequence of eleven identical bits of one polarity followed by eleven bits of the opposite polarity (e.g., 00000000000111111111111 or its complement), otherwise referred to herein as an (11,11) pattern. Thus, once every 588 data clock periods a data track signal should contain a pulse width of eleven clock periods. Analogous methods may be used for other disk formats.

Figure 5:
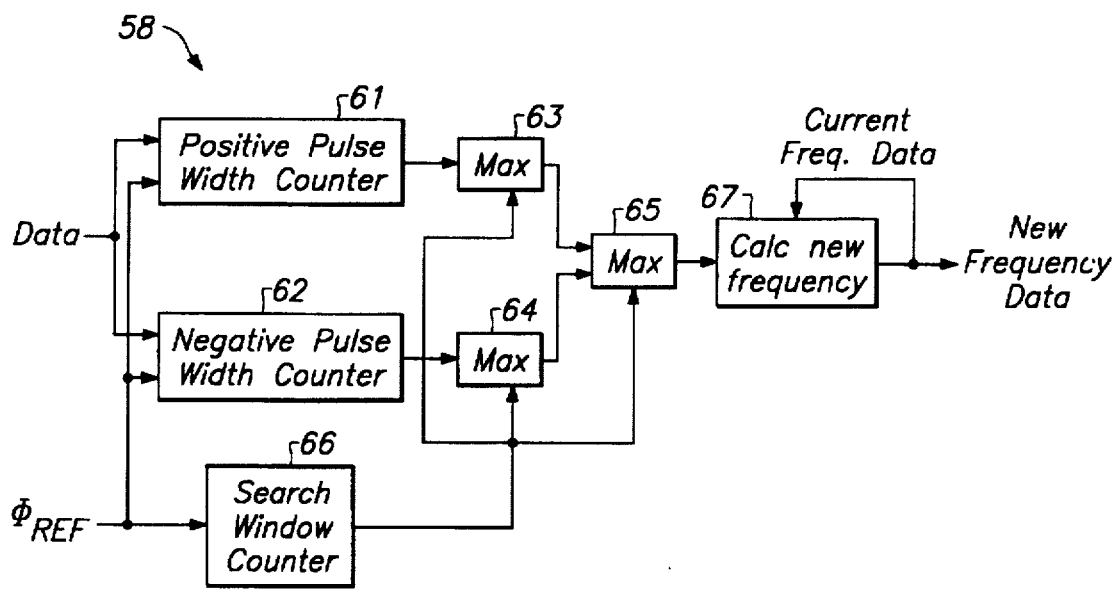
FIG. 5 is a block diagram of exemplary frequency detector circuitry of FIG. 4.

Referring now to FIG. 5, frequency detector 58 includes two counters, positive pulse width counter 61 and negative pulse width counter 62. Positive pulse width counter 61 is reset during a negative half-cycle of the reference track data signal. During a positive half cycle, positive pulse width counter 61 measures the width of the half-cycle by counting cycles of clock $\Phi_{REF}$. Similarly, negative pulse width counter 62 measures the width of negative half-cycles of the reference track data signal.

Maximum tracking circuitries 63 and 64 keep track of the largest count reached by pulse width counters 61 and 62, respectively, during a search interval or window. Maximum selecting circuitry 65 then selects the larger of the outputs of maximum tracking circuitries 63 and 64 for use in calculating a new frequency increment by block 67.

Search window counter 66 is configured to periodically reset maximum tracking circuitries 63 and 64, and maximum selecting circuitry 65. Because each frame of data begins with an (11,11) pattern, frequency detector 58 should see an eleven-bit-wide pulse at least once a frame. Therefore, search window counter 66 should not reset the other circuits more often than once per data frame. For example, search window counter 66 may reset the maximum tracking and selecting circuitries 63–65 at most once every 588 data clock cycles, and preferably about every 600 data clock cycles.

As noted above, the maximum pulse width should be eleven bit periods wide. A pulse width more than eleven bit periods wide indicates that the reference clock frequency is to high, and should be reduced. Conversely, a shorter pulse width indicates a reference clock frequency that is too low. From equation (1), the reference clock frequency is directly proportional to the frequency increment, thus, the reference clock frequency may be raised by using a larger frequency increment. Although many functions may be used to calculate a new frequency increment, a suitable function for this purpose is given by:

$$(\text{Freq. Increment})_{new} = (\text{Freq. Increment})_{old} \times \frac{11\ \text{bit periods}}{\text{Max pulse width}} \quad (2)$$

Wherein max pulse width refers to the length of an 11-bit pattern as measured by counters 61 or 62; and 11 bit periods refers to the correct length.

At times, large changes in the reference clock frequency may be undesirable. For example, when trying to lock onto the frequency of the reference $$FI_{current} = (1-\alpha)FI_{new} + (\alpha)FI_{old} \quad (3)$$

track data signal after repositioning pickup 32 (FIG. 2), large changes in reference frequency may be acceptable.

However, after frequency lock occurs and data is being read from multiple data tracks on the disk, sudden large changes in the reference clock frequency may cause data errors. Accordingly, the frequency increment is preferably filtered to provide a controlled transition from the old value to the new value.

For example, the frequency increment may be filtered using Equation 3. In Equation 3 the current frequency increment is a weighted average of the old frequency increment and the new frequency increment calculated from Equation 2, wherein the relative contribution of the old and new values is determined by the value of $\alpha$. Thus, the size of any change in the reference clock frequency may be limited through appropriate selection of $\alpha$. For example, small values of $\alpha$ enable large frequency changes so a new frequency may be acquired more rapidly, whereas large values of $\alpha$ limit frequency changes when frequency lock is obtained. Preferably, $\alpha$ is a power of 2, so that Equation 3 may be calculated using simple shift and add operations.

Figure 6:
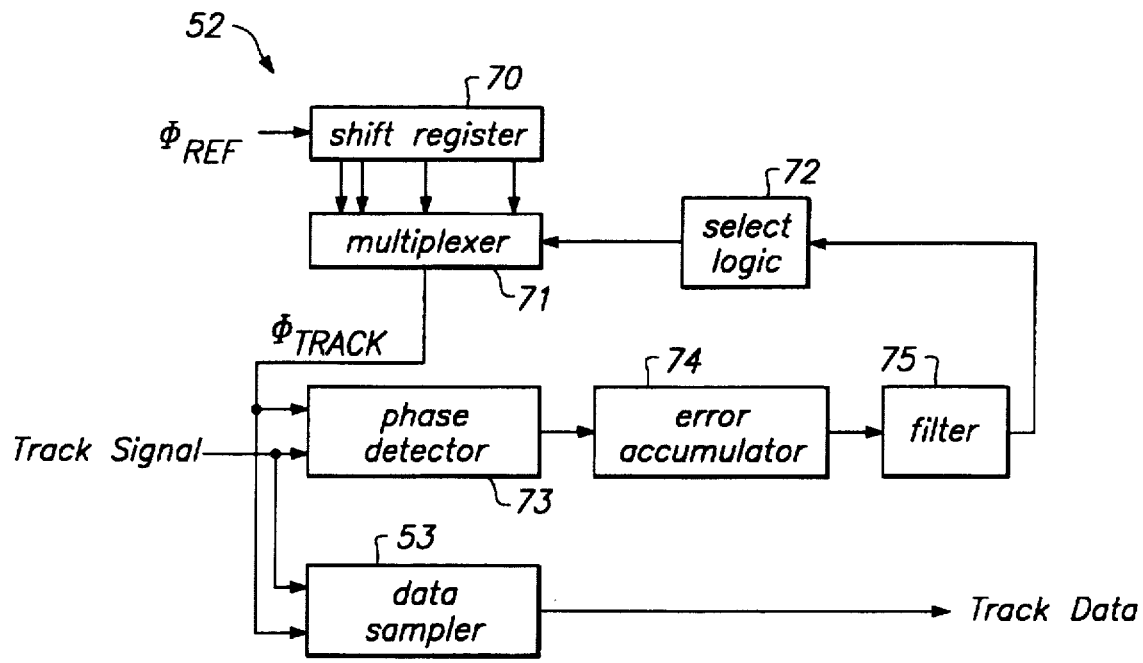
FIG. 6 is a block diagram of the data aligner and data sampler circuitry of FIG. 3.

Referring to FIG. 6, data aligner circuitry 52 of front end circuitry 34 uses reference clock signal $\Phi_{REF}$ to generate track data clocks, $\Phi_{TRACK}$, synchronized to each track being read. Front end circuitry 34 also includes data sampler 53 which uses a corresponding $\Phi_{REF}$ to sample the track data signals $T_1-T_m$ at the center of each bit period.

Reference clock signal $\Phi_{REF}$ is used as the clock input to shift register 70, which is configured as a ring counter. Shift register 70 is loaded with a bit pattern having only a single bit which is set, for example $01000000_2$, the remaining bits being cleared. Each pulse of reference clock $\Phi_{REF}$ causes the bit pattern in shift register 70 to shift one bit position, or cell. A bit which is shifted out the end of shift register 70 is "wrapped around" and shifted back in at the other end of the shift register. Thus the single set bit in shift register 70 circulates through each cell in the register at a rate determined by reference clock $\Phi_{REF}$.

The value of each cell in shift register 70 is input to multiplexer 71, which functions to output the value of a selected one of the shift register cells. The combination of shift register 70 and multiplexer 71 functions to divide the frequency of reference clock $\Phi_{REF}$ by the number of bits in the shift register to produce track data clock $\Phi_{TRACK}$. For example, if shift register 70 were to have eight bits, each bit position would have a '1' bit in it only once every eight pulses of the reference clock. Thus if multiplexer 71 were to selectively output the value of bit three of shift register 70, the output of the multiplexer would be a '1' whenever there was a '1' in bit position three of the shift register, i.e. once every eight pulses of reference clock $\Phi_{REF}$.

Ideally, the phase of the track data clock $\Phi_{TRACK}$ should be such that the track data signal, $T_n$, is sampled at the center of each bit period. If the track data clock phase is not correct, the track data signal may be sampled too early or too late in each bit period, thereby risking sampling the data track signal during a transition from one bit to the next. Phase detector 73 measures the relative phase between track data clock $\Phi_{TRACK}$ and track data signal $T_n$ and provides an error signal indicative of the phase error to error accumulator 74.

Filter 75 smooths the accumulated phase error values to remove clock jitter and small variations in phase error. The output of filter 75 is used by select logic 72 to control multiplexer 71 to reduce any phase error. When the error is sufficiently large to warrant corrective action, selector 72 adjusts phase of track clock $\Phi_{TRACK}$ by causing multiplexer 71 to select a different input to pass through to its output. Changing the input of multiplexer 71 either inserts or removes a small amount of time to the interval from one track clock pulse to the next such pulse. For example, if shift register 70 has eight bits and is designed to shift bits to the right, and if selector 72 causes multiplexer 71 to change its input one bit to the left, the next pulse output by multiplexer 71 will occur on the seventh reference clock pulse instead of the eighth. Conversely, changing the input of multiplexer 71 one bit position to the right will cause a track clock pulse to occur on the ninth reference clock pulse. Thus by changing the bit selected by multiplexer 71, the phase and frequency differences between the reference track data signal and another track data signal can be corrected.

Because a track clock pulse cannot be dropped or missed without corrupting the recovered data, selector 72 includes logic to prevent selection of a different input by the multiplexer at an inopportune time. For example, if multiplexer 71 is reading bit position 6 of shift register 70, a '1' is in bit position five, and shift register 70 shifts right (i.e. the '1' in bit position six moves to bit position five) at the same instant selector 72 switches the input of multiplexer 71 from bit position five to bit position six, a clock pulse will be missed, and a data bit will not be sampled correctly. Just as a change in input to multiplexer 71 in a direction opposite to the direction of the bit shifts in shift register 70 can cause a dropped clock pulse, a change in the same direction as the bit shifts can cause an extra clock pulse to occur. Since too few, or too many clock pulses may garble the data being read, selector 72 monitors the output of shift register 70 to avoid the occurrence of situations which may lead to data corruption.

Figure 7:
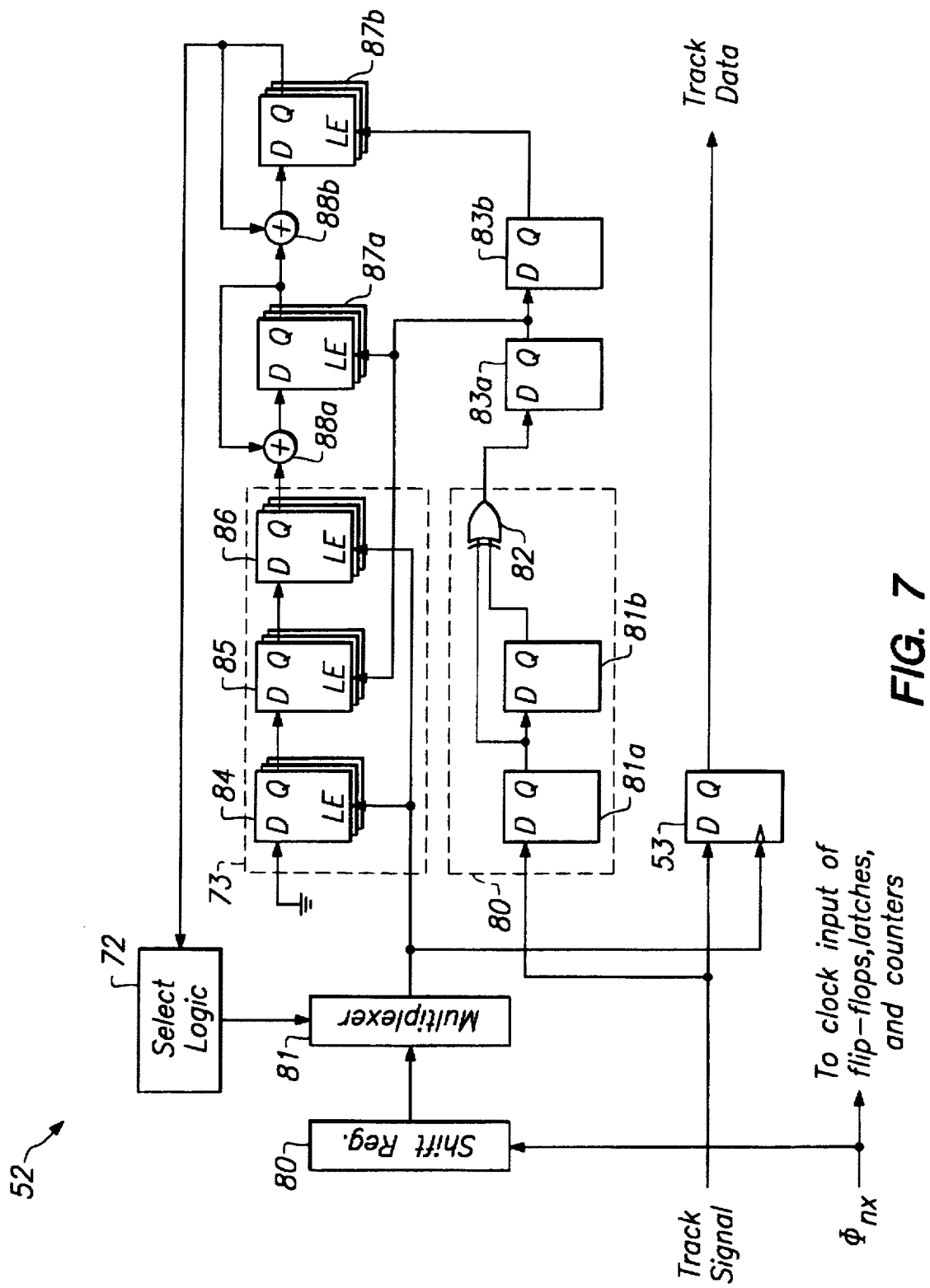
FIG. 7 is a more detailed block diagram of the exemplary data aligner and data sampler circuitry of FIG. 6.

A more detailed illustrative embodiment of data aligner and data sampler circuitry 51 of FIG. 6 is described with respect to FIG. 7. Edge detector 80 comprises flip-flops 81a and 81b, and XOR gate 82. Flip-flops 81a and 81b are configured as a shift register having an input connected to the track data signal $T_n$ and clocked by reference clock, $\Phi_{REF}$. XOR gate 82 compares the values of the two flip-flops and provides an edge signal whenever the outputs of the flip-flops differ, thus indicating an edge in the track data signal. The edge signal is latched by flip-flop 83a. Flip-flop 83b holds the previous value of the edge signal.

Phase detector 73, including up-counter 84, down-counter 85, and latch 86, determines the phase relationship between the occurrence of pulses of the track data clock, $\Phi_{TRACK}$, output by multiplexer 71 and edges in the track data signal as determined by edge detector 80. Ideally, a signal from edge detector 80 should occur midway between successive pulse of track data clock $\Phi_{TRACK}$. An edge signal which occurs early indicates that track clock $\Phi_{TRACK}$ is slow, and conversely a late edge pulse indicates the track clock is fast.

Up-counter 84 is reset by the track data clock, and begins counting up at a rate determined by reference clock $\Phi_{TRACK}$. When an edge is detected by edge detector 80, the output of up-counter 84 is loaded into down-counter 85, which counts down at the same rate as up-counter 84. On a subsequent track clock pulse, the value of down counter 85 is latched by latch 86. If the edge occurred midway between successive track data clocks, the time spent counting up equals the time spent counting down and the value in latch 86 should be zero. However, if the edge occurs early, more time is spent counting down and a negative value is latched. Conversely, a positive value indicated a late edge detection.

The output of phase detector 73 indicates the position of an edge pulse relative to the midpoint between successive track clock pulses, and, therefore, represents a phase error in the track data clock. The phase error is accumulated by latch 87a and adder 88a, and subsequently filtered by adder 88b and latch 87b to produce an average error level. Note that it may be necessary to sign extend the output of phase detector 73, to avoid underflow and overflow conditions in adders 88a and 88b. As described herein above, the average, filtered, phase error signal is then used by select logic 72 to control multiplexer 71 and thereby adjust the track data clock phase and frequency as needed to minimize the average phase error.

Figure 8A:
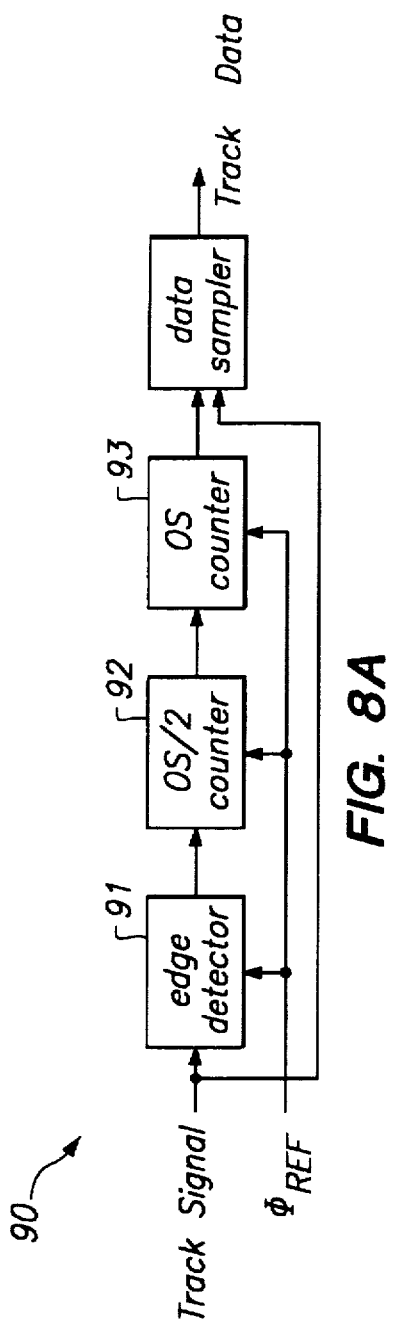
FIGS. 8A and 8B are, respectively, an alternative embodiment of the data aligner of FIG. 6 and a corresponding timing diagram.

In FIG. 8A, alternative data aligner 90 is shown. As discussed hereinabove, reference clock $\Phi_{REF}$ is derived from the reference track data signal. Since it has a frequency that is a multiple of the reference track data frequency, an interval corresponding to bit period in the track data signal may be measured by counting cycles of $\Phi_{REF}$. The ratio of $\Phi_{REF}$ to the reference track data rate is referred to herein as the over sampling factor.

Data aligner 90 includes edge detector 91, which may be the same as edge detector 80 of FIG. 7, as well as counters 92 and 93. When an edge is detected in the track data signal by edge detector 91, counter 92 is reloaded with a value equal to half the over sampling factor and begins counting down at a rate determined by $\Phi_{REF}$. When counter 92 reaches zero the track data signal is sampled and the counter stops counting. Since the initial count in counter 92 was half the over sampling factor, the track data signal is sampled approximately in the middle of the first bit period following the detected edge.

In addition, when counter 92 reaches zero, counter 93 is loaded with a value equal to the over sampling factor and begins to count down. Thus, counter 93 measures a one bit period interval beginning half a bit period after an edge in the track data signal. When counter 93 subsequently reaches zero, the track data signal is sampled. However, unlike counter 92, counter 93 repeatedly reloads and counts down, so that the track data signal is sampled at successive bit periods.

Figure 8B:
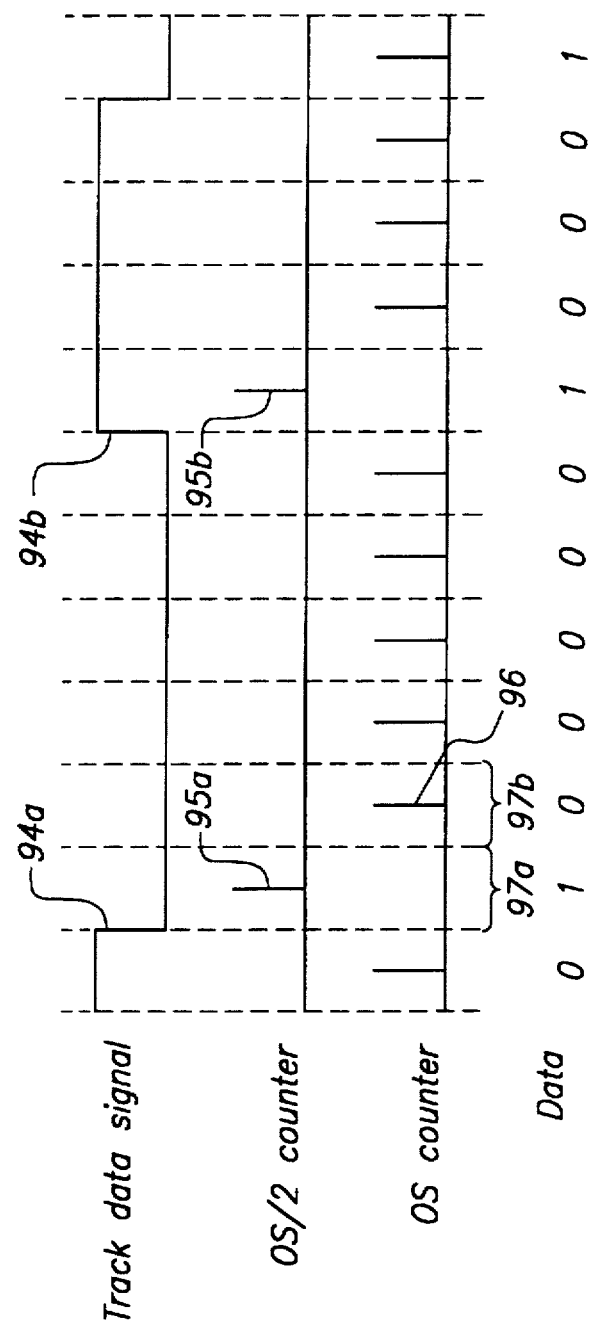

The operation of data aligner 52 of FIG. 8A may be more clearly understood by considering the timing diagram of FIG. 8B. Wherein edge 94a causes counter 92 to reload and begin counting down. Counter 92 reaches zero and outputs signal 95a near the mid point of bit period 96a. This signal reloads counter 93 and also causes the track data signal to be sampled. Counter 93 then reaches a zero count and outputs signal 97a causing the track data signal to be sampled near the mid point of bit period 96b. Counter 93 repeats its countdown, thus, sampling successive bits in the track data signal until reset by counter 92 following edge 94b. Also shown is an exemplary decoding of the track data signal of FIG. 8B.

Figure 9:
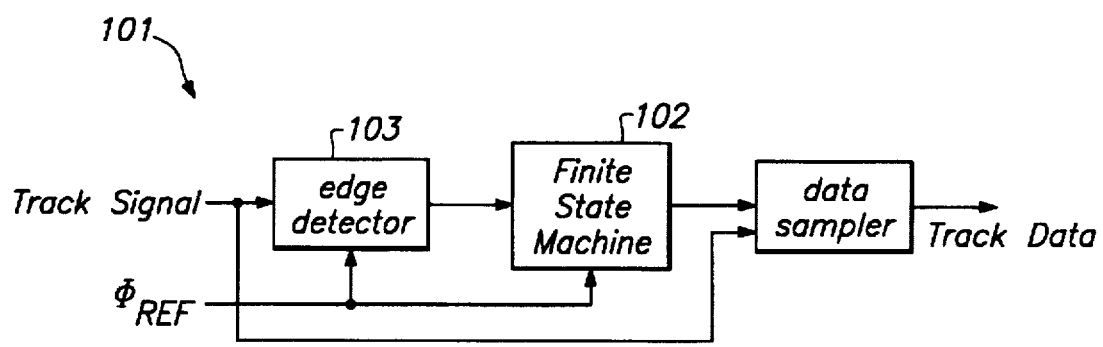
FIG. 9 is yet another illustrative embodiment of the data aligner of FIG. 6.

A somewhat simpler embodiment of the data aligner is shown in FIG. 9. Data aligner 101 includes synchronous finite state machine (FSM) 102 having a number of states equal to the over clocking factor. An exemplary state transition table for an eight state FSM

| this state | next state | | Output |
|---|---|---|---|
| | no edge | edge | |
| 7 | 6 | 4 | 0 |
| 6 | 5 | 4 | 0 |
| 5 | 4 | 4 | 0 |
| 4 | 3 | 4 | 0 |
| 3 | 2 | 4 | 0 |
| 2 | 1 | 4 | 0 |
| 1 | 0 | 4 | 0 |
| 0 | 7 | 4 | 1 | is shown below.

Absent a signal from edge detector 103, FSM 102 cycles to the next state on each cycle of $\Phi_{REF}$. When state '0' is reached, a signal is output causing the track data signal to be sampled at fixed intervals equal to one bit period. However, when an edge has been detected, FSM 102 transitions to a middle state, e.g., state four, such that state '0' will be reached, and the track data signal sampled, half a bit period following the detected edge. Thus, the occurrence of an edge in the track data signal re-synchronizes FSM 102 with the track data signal so that data sampling occurs near the mid point of each bit period.

While preferred illustrative embodiments of the present invention are described, it will be apparent to one skilled in the art that various changes and modifications may be made therein without departing from the invention, and it is intended in the appended claims to cover all such changes and modifications which fall within the true spirit and scope of the invention.

What is claimed is:

1. Apparatus for recovering a data clock from a self clocking data signal comprising a plurality of pulses, wherein at least one of the plurality of pulses has a unique pulse width, the apparatus comprising:

measuring circuitry for measuring the width of each of the plurality of pulses;

timing circuitry for measuring a time period;

identifying circuitry, coupled to the measuring circuitry and timing circuitry, for identifying the occurrence of a pulse having the unique pulse width during the time period; and calculation circuitry for calculating a value representative of the frequency of the data clock from the measured pulse width of the pulse having the unique pulse width.

2. The apparatus as defined in claim 1 wherein the pulse having a unique pulse width has a pulse width at least as long as any other pulse of the plurality of pulses.

3. The apparatus as defined in claim 2 wherein the identifying circuitry identifies the longest pulse width during the time period.

4. The apparatus as defined in claim 1 wherein the pulse having a unique pulse width has a pulse width no longer than the pulse width of any other pulse of the plurality of pulses.

5. The apparatus as defined in claim 4 wherein the identifying circuitry identifies the shortest pulse width during the time period.

6. The apparatus as defined in claim 1 further comprising reference clock circuitry coupled to the measuring and timing circuitry.

7. The apparatus as defined in claim 6 wherein the measuring and timing circuitry comprise counters counting cycles of the reference clock.

8. The apparatus as defined in claim 6 further comprising a high frequency clock wherein the reference clock circuitry comprises an accumulator and wherein an increment is added to a value stored in the accumulator responsive to the high frequency clock.

9. The apparatus as defined in claim 8 wherein the calculation circuitry comprises a filter for filtering the measured pulse widths to produce a filtered value and wherein the filtered value is the increment.

10. A method for recovering a data clock from a self clocking data signal comprising a plurality of pulses of varying widths, the self clocking data signal including at least one pulse having a unique pulse width, the method comprising:

measuring the width of each of the plurality of pulses;

measuring a time period;

identifying the occurrence of the at least one pulse having the unique pulse width within the time period; and calculating a frequency of the data clock from a measured pulse width of the at least one pulse having the unique pulse width.

11. The method as defined in claim 10 wherein the at least one pulse having a unique pulse width has a pulse width at least as long as any other pulse of the plurality of pulses, and the step of identifying comprises identifying a maximum pulse width.

12. The method as defined in claim 10 wherein the at least one pulse having a unique pulse width has a pulse width no longer than the pulse width of any other pulse of the plurality of pulses, and the step of identifying comprises identifying a minimum pulse width.

13. The method as defined in claim 10 further comprising a step of providing a reference clock, the steps of measuring the width and measuring the time comprising steps of counting cycles of the reference clock.

14. The method as defined in claim 13 further comprising a step of providing a high frequency clock, the step of providing the reference clock comprising accumulating increments to a value responsive to the high frequency clock.

15. Method as defined in claim 14 wherein the step of providing the reference clock further comprises filtering the measured pulse widths to produce a filtered value and wherein the step of accumulating increments comprises a step of adding the filtered value.

* * * * *